US012568379B2

(12) United States Patent
Montero Bayo et al.

(10) Patent No.: US 12,568,379 B2
(45) Date of Patent: Mar. 3, 2026

(54) METHOD FOR A NETWORK ENTITY FOR CONTROLLING A COMMUNICATION, METHOD FOR A COMMUNICATION DEVICE, APPARATUS, VEHICLE AND COMPUTER PROGRAM

(71) Applicant: VOLKSWAGEN AKTIENGESELLSCHAFT, Wolfsburg (DE)

(72) Inventors: Luca Montero Bayo, Barcelona (ES); Andreas Pfadler, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 517 days.

(21) Appl. No.: 18/147,741

(22) Filed: Dec. 29, 2022

(65) Prior Publication Data

US 2023/0217257 A1 Jul. 6, 2023

(30) Foreign Application Priority Data

Dec. 30, 2021 (EP) ..................................... 21218327

(51) Int. Cl.
*H04W 64/00* (2009.01)
*H04W 4/02* (2018.01)
(Continued)

(52) U.S. Cl.
CPC ............. *H04W 16/10* (2013.01); *H04W 4/02* (2013.01); *H04W 72/04* (2013.01); *H04W 72/51* (2023.01)

(58) Field of Classification Search
CPC ..... H04W 4/021; H04W 16/10; H04W 16/28; H04W 72/04; H04W 64/003
See application file for complete search history.

(56) References Cited

U.S. PATENT DOCUMENTS

2009/0135770 A1 5/2009 Chen et al.
2013/0279356 A1* 10/2013 Park ................... H04B 7/06952
370/252
(Continued)

FOREIGN PATENT DOCUMENTS

EP 3799330 A1 3/2021
WO 2015135987 A1 9/2015
(Continued)

OTHER PUBLICATIONS

Office Action; European Patent Application No. 21218327.1; Feb. 21, 2024.
(Continued)

*Primary Examiner* — Shukri Taha
(74) *Attorney, Agent, or Firm* — BARNES & THORNBURG LLP

(57) ABSTRACT

A method for a network entity. The method for controlling a communication between a first communication device and a second communication device includes obtaining positions of communication devices and determining radiation boundary areas in an environment of the communication devices. The method also includes allocating a radiation boundary area of the radiation boundary areas to the first communication device of the communication devices to communicate with the second communication device of the communication devices and transmitting information about the allocated radiation boundary area to the first communication device and/or the second communication device.

19 Claims, 5 Drawing Sheets

Omnidirectional    Beam-based      Beam-shaped

(51) Int. Cl.
　　H04W 16/10　　　(2009.01)
　　H04W 72/04　　　(2023.01)
　　H04W 72/51　　　(2023.01)

(56)　　　　　　　　References Cited

U.S. PATENT DOCUMENTS

| | | | |
|---|---|---|---|
| 2017/0134975 | A1 | 5/2017 | Huang et al. |
| 2017/0279641 | A1 | 9/2017 | Liu et al. |
| 2020/0395993 | A1* | 12/2020 | Ryu ..................... H04B 7/0695 |
| 2022/0399917 | A1* | 12/2022 | Shin ..................... H04L 5/0055 |
| 2023/0180187 | A1* | 6/2023 | Kim ..................... H04W 72/51 |
| | | | 370/329 |
| 2024/0414560 | A1* | 12/2024 | Montero Bayo ..... H04W 16/28 |
| 2024/0421879 | A1* | 12/2024 | Yin ..................... H04L 1/1893 |

FOREIGN PATENT DOCUMENTS

| | | | |
|---|---|---|---|
| WO | 2019236424 | A1 | 12/2019 |
| WO | 2021101196 | A1 | 5/2021 |

OTHER PUBLICATIONS

Martin-Vega et al.; Key Technologies, Modeling Approaches, and Challenges for Millimeter-Wave Vehicular Communications; IEEE Communications Magazine; Oct. 2018.
Extended European Search Report; European Patent Application No. 21218327.1; Jun. 22, 2022.

* cited by examiner

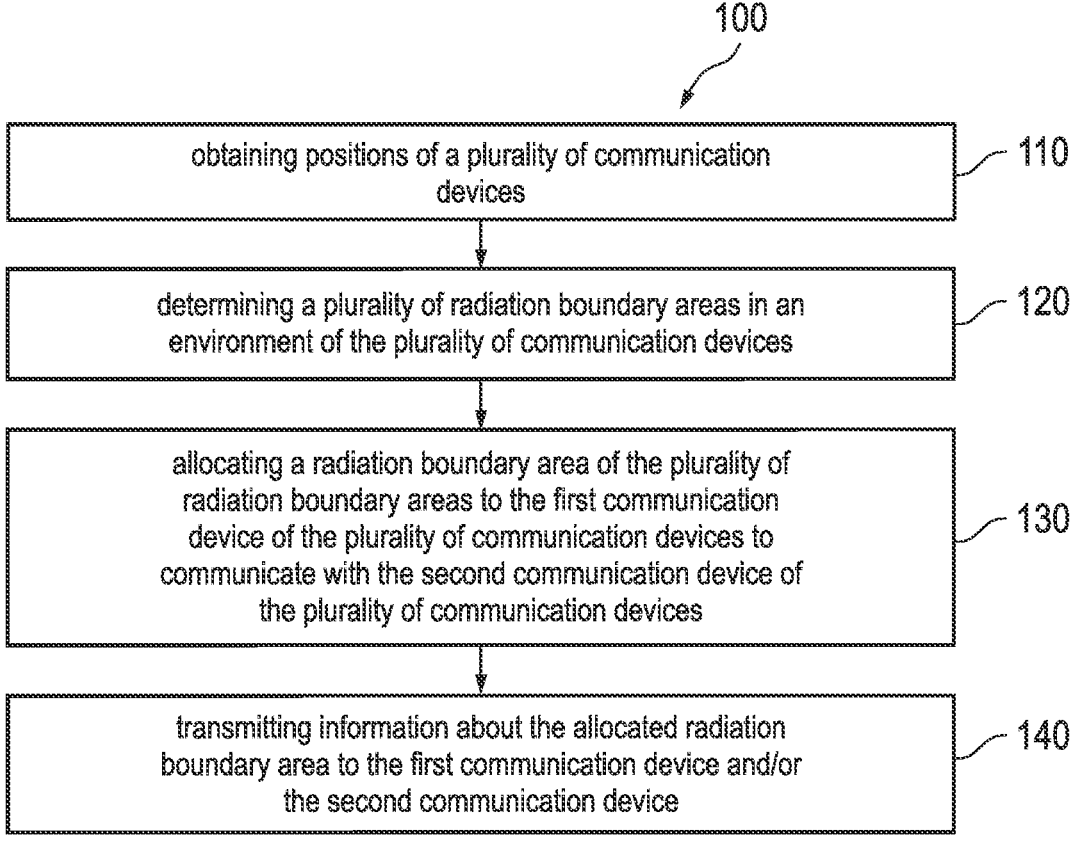

100 obtaining positions of a plurality of communication devices — 110 determining a plurality of radiation boundary areas in an environment of the plurality of communication devices — 120 allocating a radiation boundary area of the plurality of radiation boundary areas to the first communication device of the plurality of communication devices to communicate with the second communication device of the plurality of communication devices — 130 transmitting information about the allocated radiation boundary area to the first communication device and/or the second communication device — 140

Fig. 1

METHOD FOR A NETWORK ENTITY FOR CONTROLLING A COMMUNICATION, METHOD FOR A COMMUNICATION DEVICE, APPARATUS, VEHICLE AND COMPUTER PROGRAM

PRIORITY CLAIM

This patent application claims priority to European Patent Application No. 21218327.1, filed 30 Dec. 2021, the disclosure of which is incorporated herein by reference in its entirety.

SUMMARY

Illustrative embodiments relate to the field of wireless communication. Illustrative embodiments relate to a method for a network entity for controlling a communication, a method for a communication device, an apparatus, a transportation vehicle and a computer program, more particularly, but not exclusively, to a concept for controlling a communication between a first communication device and a second communication device, e.g., to utilize a radiation boundary area for controlling the communication between the first communication device and the second communication device.

BRIEF DESCRIPTION OF THE DRAWINGS

Disclosed embodiments will be described in more detail below with reference to the accompanying figures, in which:

FIG. 1 shows an exemplary embodiment of a method for a network entity;

DETAILED DESCRIPTION

Figure 2:
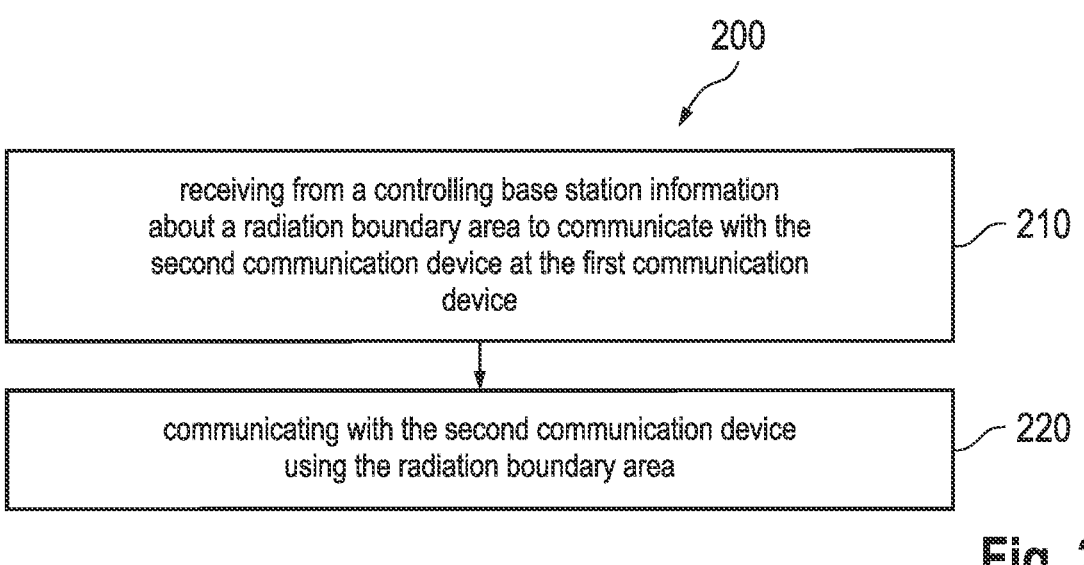
FIG. 2 shows an exemplary embodiment of a method for a first communication device.

The development of 5G has brought increased attention to the automotive industry as a vertical manufacturer expected to leverage the most advanced features of the new generation of wireless communications. Among the main novelties of 5G, a wide range of spectrum possibilities (currently licensed up to the 28 GHz band—the first-ever Millimeter wave band for mobile use), enhanced support for high mobility scenarios and new mechanisms to guarantee and predict the experienced Quality of Service (QoS), have been established as key functions to support an increasingly connected transportation ecosystem. Besides, the latest standard release (Rel. 16) has given support to Vehicle-to-Everything (V2X) communications with New Radio (NR) technology, allegedly allowing transportation vehicles to make use of the same spectrum options, even for Vehicle-to-Vehicle (V2V) use cases.

Providing the NR support of V2X, transportation vehicles are also capable of communicating at frequencies above 6 GHz. In 5G, these higher frequency bands are allocated at the mmWave range of the spectrum (30-300 GHz). The use of higher frequency bands in communications implies propagating in a harsher channel, where the free-space path loss scales with ($f^2$), and shading by obstacles and atmospheric effects (e.g., water vapor and oxygen absorption, or rain) take a non-negligible role. Services relying on higher frequency systems, with their inherently high channel-induced attenuation, might find challenging to deliver satisfactory QoS in some situations where signal power attenuation is increased, lowering the received Signal-to-Noise Ratio. As a result, 5G User Equipment (UE) is reliant on multi-antenna front ends to perform beamforming and focus the radiate power towards the intended transmitter/receiver. It is thus worth considering that transportation vehicles may be equipped with an advanced multi-antenna system.

US 2009/0135 770 A1 reveals a method for allocating a spatial radio resource in a communication system. The method comprises determining a threshold according to at least a parameter of the communication system and determining whether at least one wireless communication apparatus in the communication system is a candidate being capable of utilizing the spatial radio resource according to the threshold. Further, the method comprises scheduling priorities for a plurality of wireless communication apparatuses each being the candidate and allocating the spatial radio resource according to the priorities of the wireless communication apparatuses each being the candidate.

US 2017/0279 641 A1 reveals a method used in a control node and an associated control node. The method comprises determining to apply a sounding and sensing related configuration for the serving radio node in each link of the one or more links, if at least one link related parameter of the link satisfies a first predefined condition and transmitting an enablement signal to the serving radio node, the enablement signal indicating enabling application of the sounding and sensing related configuration in the link. The method is further used in a serving radio node under control of a control node and an associated serving radio node.

US 2017/0134 975 A1 reveals a method for increasing the efficiency of Wi-Fi networks by increased spatial reuse, which refers to sharing the same Wireless spectral resources over different spatial regions. A technique for doing this is for a Wi-Fi device to increase the threshold of the clear channel assessment (CCA) so as to ignore and regard as interference the transmissions from other devices. The sensing range of the Wi-Fi device then decreases, and the spatial resource can be reused by different Wi-Fi devices in different spatial locations.

WO 2019/236 424 A1 discloses a relay node, which determines a first predicted motion of a first transportation vehicle including a first wireless communication device having a first established communication channel with the relay node. The relay node determines that the first predicted motion will trigger a communication condition for the first transportation vehicle and a second wireless communication device having a second established communication channel with the relay node. The relay node reserves radio resources for a third communication channel between the first wireless communication device and the second wireless communication device.

EP 3 799 330 A1 discloses wireless devices, which communicate with each other, for example, via sidelink. A wireless device requests reference signals from another wireless device to determine a new beam to prevent beam failure of wireless communications. A base station sends beam information for sidelink communications to assist a wireless device in recovering from a beam failure.

WO 2015/135987 A1 discloses spatial sensor data, such as position, movement and rotation, which is provided by a sensor in a wireless communication device in a wireless communication system is used. By using the spatial sensor data it is possible to calculate predicted spatial data for use in controlling antenna beams for transmission as well as reception in the Wireless communication system.

US 2020/395 993 A1 discloses a base station which detects a trigger condition. Further, the base station may determine that the trigger condition is satisfied based at least in part on a motion sensor information. The base station may trigger or transmit an update to a parameter for sidelink management based at least in part on the trigger condition being satisfied.

FRANCISCO J. MARTIN-VEGA ET AL: "Key Technologies, Modeling Approaches, and Challenges for Millimeter-Wave vehicular Communications" discloses a review paper of the state-of-the art modelling frameworks that are being considered for vehicular communications. In principle, document D1 deals with the concept of full-duplex communication. One facet is minimizing self-interference between transmission and receive signals. This could be achieved by adjusting the transmission signal and the receive signal. This fact can be used to device a scheduling algorithm to select transmitter and receiver parts.

When using directive antennas instead of omnidirectional antennas, undesired radiation towards a wide region in (angular) space is minimized and thus interference exerted towards other users can be potentially reduced. This can enhance the rate of time and frequency resource reuse and increase the Quality of Service of the links. However, this paradigm requires increased knowledge by all nodes or at least one node (e.g., base station) that can intelligently manage these resources. As the radiation from nodes shifts from omnidirectional to beam-based, the footprint of the antenna patterns projected in space is a resource to plausible to work with, and it is thus worth considering that space itself might also be allocated in the scheduling strategies for future communications.

It is, therefore, a finding that a communication between a first communication device and a second communication device can be controlled by allocating a radiation boundary area to the first communication device, which is used by the first communication device to communicate with the second communication device. This way, space in an environment can be used more efficiently, e.g., by allocating and/or maintaining radiation boundary areas for different communication devices. Thus, an interference between different communication devices may be reduced and/or a performance of a mobile communication system may be improved.

A further finding is that a communication between a first communication device and a second communication device can be improved by adjusting at least one antenna system parameter of a communication link of a communication device of a plurality of communication devices, such that an interference with the communication link between the first communication device and the second communication device can be reduced. This way, an (negative) impact of communication links of other communication devices on the communication link between the first communication device and the second communication device can be reduced or even omitted and/or a performance of a mobile communication system can be improved.

Examples provide a method for a network entity for controlling a communication between a first communication device and a second communication device. The method comprises obtaining positions of a plurality of communication devices and determining a plurality of radiation boundary areas in an environment of the plurality of communication devices. Further, the method comprises allocating a radiation boundary area of the plurality of radiation boundary areas to the first communication device of the plurality of communication devices to communicate with the second communication device of the plurality of communication devices and transmitting information about the allocated radiation boundary area to the first communication device and/or the second communication device. Thus, the network entity may allocate a radiation boundary area, which can be used for communication with the second communication device by the first communication device. This way, resources for communication, e.g., a space, frequency, time, etc. can be assigned to different communication devices, which may increase an overall performance in a mobile communication system since a plurality of communication devices may receive allocated radiation boundary areas from the same network entity. Further, negative impact on the communication of other communication devices due to interference may be reduced.

In an example, the plurality of radiation boundary areas may be determined based on a structured grid. This way, a determination of the radiation boundary areas can be eased, and computational efforts can be reduced.

In an example, the plurality of radiation boundary areas may be determined based on an antenna capability of the first communication device and/or the second communication device. This way, the radiation boundary area can be determined in an improved way, e.g., by a shape of a radiation pattern that the antenna system of the communication device can generate. This ensures that the radiation boundary area can be used by the communication device.

In an example, the plurality of radiation boundary areas may depend on a number of the plurality of communication devices. This way, the network entity can adjust the radiation boundary area to a density of communication devices. For example, for a high density of communication devices the radiation boundary area size may be decreased to increase a total number of the plurality of radiation boundary areas, such that more communication devices may communicate using their assigned radiation boundary area.

In an example, the method may further comprise allocating a frequency resource and/or a time resource for each radiation boundary area of the plurality of radiation boundary areas. This way, it can be ensured that the communication between the first communication device and the second communication device can be performed using the frequency resource and/or time resource without interference with other communication device at this frequency resource and/or time resource.

In an example, each radiation boundary area may have its own frequency resource pool and/or time resource pool. This way, the first communication device and the second communication device may determine a preferred frequency resource and/or time resource for communication.

In an example, a frequency resource and/or time resource may be only allocated once per time per radiation boundary area. This way, interferences between different communication devices using the same radiation boundary area can be avoided.

In an example, the method may further comprise allocating a radiation boundary area of the plurality of radiation boundary areas to the second communication device of the plurality of communication devices to communicate with a third communication device of the plurality of communication devices and transmitting information about the allocated radiation boundary area to the first communication device.

This way, the first communication device can be enabled to inform the second communication device about a radiation boundary area which the second communication device shall use for communication with a third communication device.

In an example, the method may further comprise obtaining information about an antenna system of each communication device of the plurality of communication devices and determining an antenna system parameter to form an antenna beam pattern for wireless communication between the first communication device and the second communication device. Further, the method may comprise transmitting the antenna system parameter to the first communication device and/or the second communication device. For example, the plurality of communication devices may comprise the first communication device and the second communication device. This way, the first communication device and/or the second communication device can receive information about an antenna system parameter which could be used by the first communication device and/or the second communication device to generate an antenna beam pattern. For example, the antenna system parameter may be comprised by the information about the located radiation boundary area.

In an example, the method may comprise generating an antenna system parameter for each communication devices of the plurality communication devices and storing the antenna system parameters for each communication device in a communication link map. Further, the method may comprise transmitting the antenna system parameter to each communication device of the plurality of communication devices. This way, the network entity can store the information about the antenna system parameters in an improved way. Further, the network entity can inform each communication device of the plurality of communication devices about an antenna system parameter, which should be used according to the communication link map.

In an example, the method may further comprise adjusting at least one antenna system parameter of the communication link map to reduce an interference of antenna beam patterns/communication links of the plurality of communication devices, which are formed by each communication device's antenna system based on the antenna system parameters of the communication link map. This way, each communication device of the plurality of communication devices can receive relevant information about antenna system parameter, which could be used, e.g., to reduce interference effects between different communication devices.

In an example, the antenna system parameter may comprise at least one parameter for communication of the group of a time resource, a frequency resource and an area in a coverage area of the network entity. This way, the first communication device can communicate with the second communication device using an appropriate parameter to reduce interference with other communication devices of the plurality of communication devices.

In an example, the antenna system parameters are used to prioritize at least one communication device of the plurality of communication devices. This way, the (controlling) network entity can assign different resources to a different communication device. For example, the first communication device may receive an increased time resource for communicating with the second communication device in comparison to another communication device of the plurality of communication devices.

In an example, the method may further comprise obtaining dynamic information about a movement state of the first communication device and/or the second communication device and determining a predicted trajectory of the first communication device. Further, the method may comprise predicting a communication failure of the first communication device communicating with the second communication device using the antenna system parameter transmitted by the network entity to the first communication device. This way, the communication between the first communication device and the second communication device can be increased by adapting the antenna system parameter to the predicted communication failure.

In an example, if the communication failure exceeds a threshold the method may further comprise adjusting the antenna system parameter of the first communication device and transmitting the adjusted antenna system parameter to the first communication device and/or the second communication device. This way, the communication between the first communication device and the second communication device can be improved by adjusting the antenna system parameter.

In an example, the method may further comprise determining a quality-of-service for a communication link of at least one communication device of the plurality of communication devices and transmitting information about the quality-of-service to the at least one communication device. This way, the at least one communication device, e.g., the first communication device or the second communication device, can be informed about a QoS, e.g., which can be used to inform a user of the first communication device.

Examples relates to a method for a first communication device for controlling a communication between the first communication device and a second communication device. The method comprises receiving from a controlling base station information about a radiation boundary area to communicate with the second communication device at the first communication device and communicating with the second communication device using the radiation boundary area. Thus, the first communication device may receive a radiation boundary area allocated by the controlling base station which may increase an overall communication performance in a mobile communication system. This way, resources for communication, e.g., a space, frequency, time, etc. can be assigned to different communication devices, which may increase the overall performance since a plurality of communication devices may receive allocated radiation boundary areas from the same network entity.

In an example, the method may further comprise transmitting information about the radiation boundary area to the second communication device. This way, the second communication device can be informed about the radiation boundary area, e.g., if no line-of-sight (LOS) connection with the controlling base station is possible.

In an example, the method may further comprise receiving from the controlling base station information about a radiation boundary area for the second communication device and transmitting information about the received radiation boundary area of the second communication device to the second communication device. This way, the second communication device can be informed about the radiation boundary area, e.g., if no line-of-sight LOS connection with the controlling base station is possible.

In an example, the method may further comprise receiving an antenna system parameter from a controlling network entity to form an antenna beam pattern with an antenna system to communicate with the second communication device and communicating with the second communication device using the antenna beam pattern. This way, parameters used for communication by the first communication device to communicate with the second communication device, e.g., the antenna system parameter, can be obtained in an improved way.

In an example, the method may further comprise transmitting dynamic information of an own movement state to the controlling network entity. This way, the controlling network entity can be enabled to consider the dynamic information for determining the antenna system parameter.

In an example, the method may further comprise receiving an adjusted antenna system parameter from the controlling network entity to form an adjusted antenna beam pattern with the antenna system to communicate with the second communication device and communicating with the second communication device using the adjusted antenna beam pattern. This way, an antenna system parameter can be adjusted by the controlling network entity and communicated to the first communication device. Thus, the first communication device can adjust its antenna beam pattern, e.g., to reduce communication failure.

In an example, the method may further comprise receiving information about a quality-of-service from the controlling network entity. This way, the first communication device, e.g., a user of the first communication device, can be informed in an improved way about a possible quality of a communication link with the second communication device.

Examples relates to a method for controlling a communication between a first communication device and a second communication device. The method comprises receiving from the first communication device information about a radiation boundary area to communicate with the first communication device at the second communication device and communicating with the first communication device using the radiation boundary area. This way, the second communication device can be informed about the radiation boundary area, e.g., if no line-of-sight LOS connection with the (controlling) base station is possible.

Examples further provide an apparatus, comprising one or more interfaces configured to communicate with a communication device or user equipment. The apparatus further comprises processing circuitry configured to control the one or more interfaces and to perform the method for user equipment and/or a communication device described above.

Examples further provide a transportation vehicle comprising the apparatus as described above.

Examples further relate to a computer program having a program code for performing the method described above, when the computer program is executed on a computer, a processor, or a programmable hardware component.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, e.g., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, operations, processes, elements, components and/or a group thereof, but do not exclude the presence or addition of one or more other features, integers, operations, processes, elements, components and/or a group thereof.

FIG. 1 shows an example of a method 100 for a network entity. The method 100 for the network entity is for controlling a communication between a first communication device and a second communication device comprises obtaining 110 positions of a plurality of communication devices and determining 120 a plurality of radiation boundary areas in an environment of the plurality of communication devices. Further, the method 100 comprises allocating 130 a radiation boundary area of the plurality of radiation boundary areas to the first communication device of the plurality of communication devices to communicate with the second communication device of the plurality of communication devices and transmitting 140 information about the allocated radiation boundary area to the first communication device and/or the second communication device. Thus, the network entity can inform the communication device about a radiation boundary area, which may improve a communication in a mobile communication system.

The first/second communication device may communicate in a mobile communication system with the network entity, e.g., a base station. For example, the first/second communication device and the network entity may communicate in/via a mobile communication system. The mobile communication system may comprise a plurality of transmission points and/or base stations operable to communicate radio signals with the first/second communication device. In an example, the mobile communication system may comprise the first/second communication device and the network entity.

A network entity, e.g., the network entity, can be located in the fixed or stationary part of the network or system. A network entity may correspond to a remote radio head, a transmission point, an access point, a macro cell, a small cell, a micro cell, a pico cell, a femto cell, a metro cell etc. The term small cell may refer to any cell smaller than a macro cell, e.g., a micro cell, a pico cell, a femto cell, or a metro cell. Moreover, a femto cell is considered smaller than a pico cell, which is considered smaller than a micro cell. A network entity can be a wireless interface of a wired network, which enables transmission and reception of radio signals to a communication device. Such a radio signal may comply with radio signals as, for example, standardized by 3GPP or, generally, in line with one or more of the above listed systems. Thus, a network entity may correspond to a NodeB, an eNodeB, a BTS, an access point, etc.

The mobile communication system may be cellular. The term cell refers to a coverage area of radio services provided by a transmission point, a remote unit, a remote head, a remote radio head, communication device, network entity or a NodeB, an eNodeB, respectively. The terms cell and base station may be used synonymously. A wireless communication device, e.g., the first/second communication device, can be registered or associated with at least one cell (e.g., the network entity), e.g., it can be associated to a cell such that data can be exchanged between the network and the mobile in the coverage area of the associated cell using a dedicated channel, connection or connection.

In general, the first/second communication device is a device that is capable of communicating wirelessly. In particular, however, the first/second communication device may be a mobile communication device, e.g., a communication device that is suitable for being carried around by a user. For example, the first/second communication device may be a User Terminal (UT) or User Equipment (UE) within the meaning of the respective communication standards being used for mobile communication. For example, the first/second communication device may be a mobile phone, such as a smartphone, or another type of mobile communication device, such as a smartwatch, a laptop computer, a tablet computer, or autonomous augmented-reality glasses. For example, the first/second communication device and the network entity may be configured to communicate in a cellular mobile communication system. Accordingly the first/second communication device and the network entity may be configured to communicate in a cellular mobile communication system, for example in a Sub-6 GHz-based cellular mobile communication system (covering frequency bands between 500 MHz and 6 GHz) or in a mmWave-based cellular mobile communication system (covering frequency bands between 20 GHz and 60 GHz). For example, the first/second communication device and the network entity may be configured to communicate in a mobile communication system/cellular mobile communication system. In general, the mobile communication system may, for example, correspond to one of the Third Generation Partnership Project (3GPP)-standardized mobile communication networks, where the term mobile communication system is used synonymously to mobile communication network. The mobile communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In addition the first/second communication device/network entity may be suitable for, or configured to, communicating/communicate via non-cellular communication systems, e.g., via a device-to-device vehicular communication system, e.g., according to the IEEE 802.11p standard (Institute of Electrical and Electronics Engineers standard 802.11p for vehicular communication) or via a wireless local area network (e.g., according to IEEE 802.11a, IEEE 802.11b, IEEE 802.11g, IEEE 802.11n, IEEE 802.11ac or IEEE 802.11ax, also known as Wi-Fi 1 through Wi-Fi 6(E)). In particular, the first/second communication device and the network entity may be suitable for, or configured to, communicating/communicate in the frequency band between 5 GHz and 7.1 GHz, which covers communication in the 5 GHz band (for WiFi in the 5 GHz band), 5.9 GHz band (for vehicular communication according to the 802.11p standard) and between 5.9 GHz and 7.1 GHz (for WiFi in the 6 GHz band).

A connection between the first/second communication device and the network entity and/or the first communication device and the second communication device may be a wireless connection, e.g., a mmWave-based connection over the mobile communication system (e.g., using carrier frequencies of at least 20 GHz) or may be performed at lower carrier frequencies, e.g., using carrier frequencies of at most 7.5 GHz. For example, the wireless connection between the first/second communication device and the network entity may be initiated using the protocols of the mobile communication system, or using a short-range communication system, such as via a wireless local area network outlined above.

As is evident from the above example, while the communication between first/second communication device and network entity and/or between first communication device and second communication device occurs via the mobile communication system, additional communication and/or alternatively communication (e.g., the first and the second communication device is a transportation vehicle) between the communication device and the network entity may occur via a vehicular communication system. Such communication may be carried out directly, e.g., by using Device-to-Device (D2D) communication. Such communication may be carried out using the specifications of the vehicular communication system. An example of D2D is direct communication between transportation vehicles, also referred to as Vehicle-to-Vehicle communication (V2V) or Vehicle-to-Everything (V2X), car-to-car, Dedicated Short Range Communication (DSRC), respectively. Technologies enabling such D2D-communication include 802.11p, 3GPP systems (4G, 5G, NR and beyond), etc.

The radiation boundary area may be a space in the environment which is used for communication between the first communication device and the second communication device. For example, a radiation energy density caused by the first communication device and/or the second communication device may be outside the radiation boundary area below a threshold, e.g., below a maximal allowed background radiation energy density which does not influence the communication of other communication devices outside the radiation boundary area. For example, a radiation energy density of a transmission of the first communication device and the second communication device used for communication between both communication devices can be neglected outside of the radiation boundary area.

Obtaining 110 positions of the plurality of communication devices may be performed by receiving information about the positions, e.g., from the first communication device, and/or by determining information about the positions. For example, the network entity may use a wide variety of sensor data types, including radar sensor data and lidar sensor data, but also, e.g., vision-related sensors such as camera and IR sensors, as well as ultrasound sensors to determine the positions of the plurality of communication devices. Optionally or alternatively, the positions of the plurality of communication devices may be determined by a used radio communication connection between the network entity and each communication device of the plurality of communication devices, e.g., using relative-strength-index, angle of arrival, etc.

Determining 120 the plurality of radiation boundaries areas can be performed by a processing unit of the network entity. For example, the network entity may divide the space, e.g., a coverage area or an area of interest (e.g., a traffic crossing) of the network entity into the plurality of radiation boundary areas. Alternatively, the network entity may divide the space into a plurality of tiles and may generate the radiation boundary areas by assigning at least one tile to each radiation boundary of the plurality of radiation boundary areas. Thus, the network entity can manage the communication between the plurality of communication devices in the coverage area, which may increase a performance of a mobile communication system comprising the network entity and the plurality of communication devices.

Allocating 130 the radiation boundary area to the first communication device may be done by the processing unit of the network entity. For example, the allocate radiation boundary area enables the first communication device to communicate with the second communication devices without using another radiation boundary area. For example, the radiation boundary area may be formed by a plurality of tiles, e.g., if a distance between the first communication device and the second communication device is greater than a length of the tiles of the plurality of tiles. Thus, the first communication device may communicate with the second communication device via a radiation boundary area consisting of a plurality of tiles.

Transmitting 140 the information about the allocated radiation boundary area to the communication device can be performed by any suitable message, e.g., by a broadcast message, groupcast message or unicast message. Thus, the information about the allocated radiation boundary area can be transmitted in a desired way, e.g., using a broadcast message to transmit the information about the allocated radiation boundary area to the communication device. For example, if the network entity is a transportation vehicle or infrastructure (such like a traffic light, etc.) and the first communication device is another transportation vehicle the information about the allocated radiation boundary area may be transmitted via V2X communication.

In an example, the plurality of radiation boundary areas may be determined 120 based on a structured grid. For example, the structured grid can be hexagonal, triangular (geodesic grid), rectangular, or any shape that can uniformly fill space. This way, a computational effort for generating the plurality of radiation boundary areas/plurality of tiles can be reduced.

In an example, the plurality of radiation boundary areas and/or the plurality of tiles may be determined 120 based on an antenna capability of the first communication device and/or the second communication device. This way, it can be ensured that the radiation boundary area/tiles can be used in a proper way by the first communication device and/or the second communication device. For example, the first and/or the second communication device may transmit an antenna capability to the network entity, to inform the network entity about possible radiation pattern that can be generated with an antenna system. Thus, the network entity can determine a shape for the plurality of radiation boundary areas/plurality of tiles which matches a shape of an adjustable radiation pattern of the first and/or second communication device.

For example, the antenna capability of the first communication device and of the second communication device may be utilized to determine an antenna system parameter to form the antenna beam pattern for wireless communication between the first communication device and the second communication device. The determined antenna system parameter can be transmitted to the first communication device and/or the second communication device. For example, the antenna system parameter can be comprised by the information about the allocated radiation boundary area. This way, the first communication device and/or the second communication device can receive an appropriate antenna system parameter to form the antenna system beam.

For example, the first communication device and or the second communication device instead of receiving information about the size of the radiation boundary area may receive the antenna system parameter for forming the antenna beam pattern. Thus, the information transmitted 140 about the allocated radiation boundary area may comprise information about a forming of an antenna beam pattern, which can be used in the allocated radiation boundary area of the first communication device, instead of information about, e.g., dimensions of the radiation boundary area. This way, a computational task can be moved from the side of the first communication device to the side of the controlling network entity.

In an example, the method may further comprise generating an antenna system parameter for each communication device of the plurality of communication devices and storing the antenna system parameters for each communication device in a communication link map. Further, the method may comprise transmitting the antenna system parameters to each communication device of the plurality of communication devices. For example, the communication link map may comprise all radiation boundary areas which are determined by the controlling network entity. For example, all communication links to be established between all communication devices of the plurality of communication devices may be comprised by the communication link map. Especially, the communication link map may comprise the antenna beam patterns of the plurality of communication devices for the determined antenna system parameters. For example, an antenna system beam may overlap at least one radiation boundary area.

In an example, the communication link map may be transmitted to a further controlling network entity. For example, at least one communication device of the plurality of communication devices is a mobile communication device and may enter/leave coverage areas of different network entities, e.g., the coverage area of the network entity or the courage area of the full and entity. By transmitting the communication link map to the further network entity the further network entity can be enabled to improve an allocation 130 of the radiation boundary area to the mobile communication device. For example, the further network entity may use information about an antenna capability stored in the communication link map (e.g., a shape of the radiation boundary area allocated to the mobile communication device indicates an antenna capability, since the mobile communication device should be able to form an antenna beam pattern to match the allocated radiation boundary area) for the mobile communication device to allocate 130 the radiation boundary area. For example, the mobile communication device may have prioritized access to time resources and/or frequency resources. This prioritized access may be stored in the communication link map, e.g., by a time resource and a frequency resource assigned to the mobile communication device, which may be only used for prioritized communication devices of the plurality of communication devices. This, way the further network entity can be informed about a specific parameter for determining/allocating the radiation boundary area (e.g., time/frequency resource for the boundary area) in an improved way.

In an example, the method may further comprise adjusting at least one antenna system parameter of the communication link map to reduce an interference of antenna beam patterns of the plurality of communication devices, which are formed by each communication device's antenna system based on the antenna system parameters of the communication link map. For example, the adjustment of the at least one antenna system parameter may be based on the communication link map. For example, the communication link map may be a representation of the environment of the plurality of communication devices (e.g., comprising the positions of plurality of communication devices) and the communication links between the plurality of communication devices. Each communication link between two communication devices of the plurality of communication devices may overlap/span at least one radiation boundary area. If multiple communication links overlap the same radiation boundary area in the communication link map an adjustment of at least one of both communication links, e.g., the antenna system parameter used from the antenna beam pattern for the communication link, may be done. The adjusted antenna system parameter may be transmitted to the respective communication device.

Optionally, the controlling network entity may first generate the communication link map based on the antenna system parameters and if a conflict can be found, e.g., a radiation boundary area is used by two communication links, a corresponding antenna system parameter of one communication link can be adjusted. A transmission of the antenna system parameters to each communication device of the plurality of communication device may be only performed when no conflict can be found in the communication link map. This, way the controlling network entity can reduce a signaling overhead for transmitting the information about the radiation boundary area to each communication device.

Figure 5A:
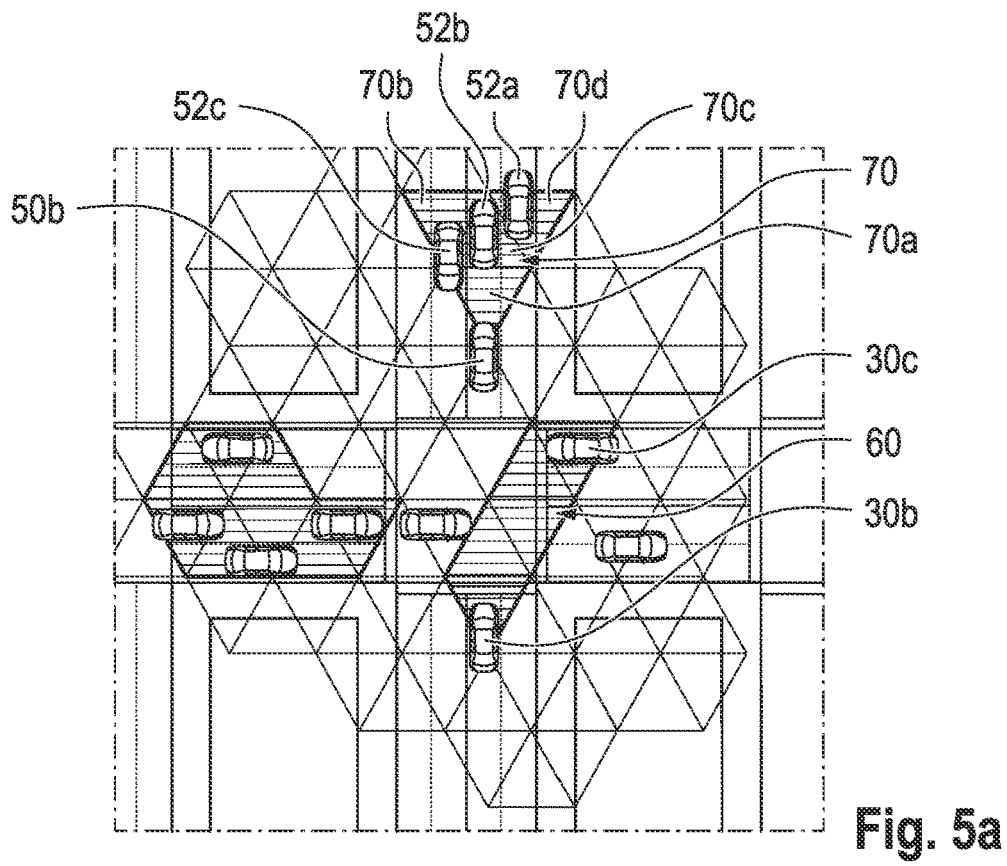
FIGS. 5a and 5b show different examples for communication between a plurality of communication devices.
Figure 5B:
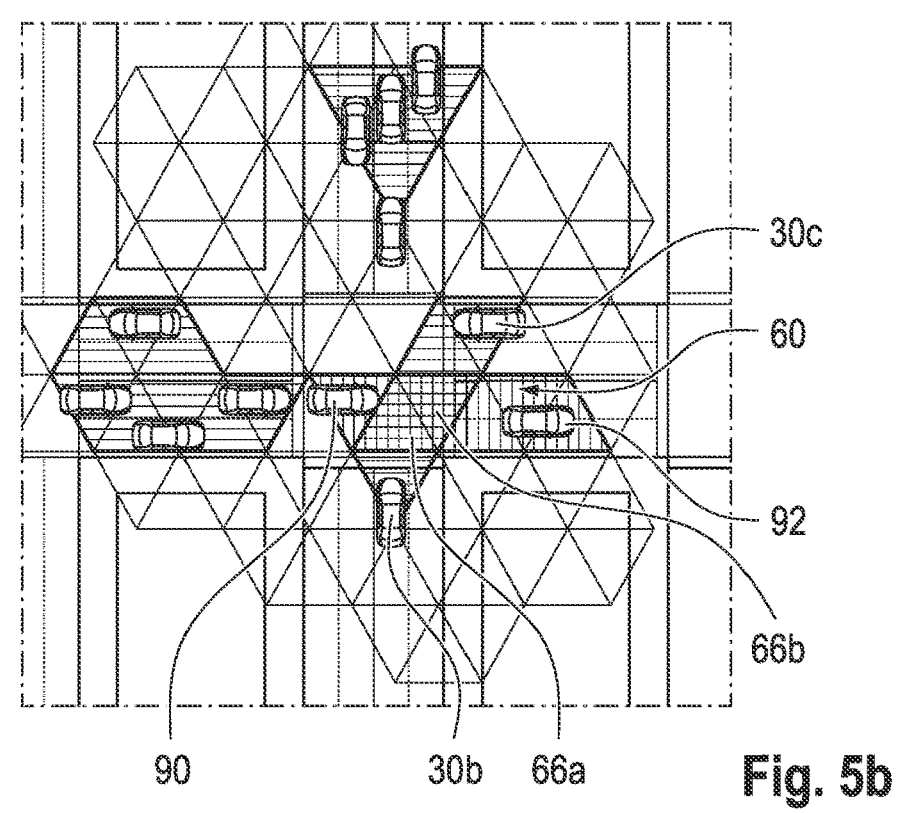

For example, the communication link map may comprise information about each radiation boundary area belonging to the network entity (see, e.g., FIGS. 5a and 5b). Further, the communication link map may comprise information about the used communication links between different communication devices of the plurality of communication devices (see, e.g., FIGS. 5a and 5b the hatched triangles). Further, the communication link map may comprise information about the position of the plurality of communication devices.

In an example, the plurality of radiation boundary areas and/or the plurality of tiles may depend on a number of the plurality of communication devices. This way, the plurality of radiation boundary areas can be adjusted to an actual situation. For example, in an open landscape with a low number of communication devices a size of a radiation boundary area/tile may be increased, e.g., to ease a determination of the plurality of radiation boundary areas or to enable a greater variety of antenna configuration which can be used by the first and/or second communication devices using this radiation boundary areas. For example, in a downtown area with a higher number of communication device a size of a radiation boundary area/tile may be decreased to ensure that each communication device of the plurality of communication device (e.g., the first communication device) may have enough radiation boundary areas to communicate with a desired other communication device (e.g., the second communication device). This way, an interference caused by the first communication device outside the radiation boundary area can be reduced, since the radiation energy density outside of the radiation boundary area can be neglected.

In an example, the method may further comprise obtaining dynamic information about a movement state of the first communication device and/or the second communication device and determining a predicted trajectory of the first communication device. Further, the method may comprise predicting a communication failure of the first communication device communicating with the second communication device using the antenna system parameter transmitted by the network entity to the first communication device. For example, the dynamic information may be combined with a number of the plurality of communication devices. For example, for an increasing movement speed of the first communication device the size of tiles of the radiation boundary areas may be decreased (comparable to a higher number of the plurality of communication devices).

For example, the dynamic information may depend on a time and/or vary with a time. For example, a communication device of the plurality of communication devices may be mobile (e.g., a transportation vehicle comprising a communication device) and thus the dynamic information may reflect a movement of the mobile communication device, e.g., a movement speed, a planned departure (e.g., at a red traffic light or at a bus stop etc.), a planned route, etc.

Further, the prediction of the communication failure may increase a reliability of the communication link between the first communication device and the second communication device. For example, a likelihood for a communication link failure may increase with an increasing movement speed of the first/second communication device, or with an increasing number of the plurality of communication devices.

Thus, the network entity can adjust the antenna system parameter accordingly to an environment and/or dynamic information of the first communication device and/or second communication device. By adjusting the antenna system parameter the likelihood of the communication failure for communication link between the first communication device and second communication device can be decreased.

In an example, if the communication failure exceeds a threshold the method may further comprise adjusting the antenna system parameter of the first communication device and transmitting the adjusted antenna system parameter to the first communication device and/or the second communication device. For example, the threshold may be of value for a likelihood of a communication failure, e.g., 10%, 30%, 50%, 70%, etc. Thus, a reliability of the communication link between the first communication device and the second communication device can be increased.

In an example, the method 100 may further comprise allocating a frequency resource and/or a time resource for each radiation boundary area of the plurality of radiation boundary areas. This way, it can be ensured that the first communication device and the second communication device can communicate with each other using the allocated 130 radiation boundary area.

In an example, each radiation boundary area may have its own frequency resource pool and/or time resource pool. This way, the first and/or the second communication device can select a desired frequency resource and/or time resource for communication with each other, which may improve the communication.

In an example, the antenna system parameter may comprise at least one parameter for communication of the group of a time resource, a frequency resource and an area in a coverage area of the network entity. For example, the area of the coverage area of the network entity may be a radiation boundary area. The communication link map may comprise these areas of the coverage areas. Further, the communication link map may comprise information about the time resource and/or the frequency resource. Thus, the communication link map may comprise all information needed for determining the antenna system parameter of each of the plurality of communication devices. This way, and adjustment of the antenna system parameter can be performed by the information comprised by the communication link map.

For example, different communication devices of the plurality of communication devices may receive the same area (radiation boundary area) from the controlling network entity for communicating with another communication device with different time resources and/or frequency resources. This way, the controlling network entity may orchestrate the communication between the plurality of communication devices, e.g., by transmitting determined antenna system parameters to each communication device of the plurality of communication devices. The determined antenna system parameters may comprise information about a time resource, a frequency resource and/or an area used for communication.

Thus, a communication between the first communication device and the second communication device can be improved. For example, interferences between the plurality of communication devices can be reduced or even omitted by adjusting the antenna system parameters, e.g., by use of the communication link map.

In an example, the antenna system parameters are used to prioritize at least one communication device of the plurality of communication devices. For example, the first communication device and the second communication device may be prioritized over each other communication device. The first and/or second communication device may receive an increased time resource, the fences that and are area for communication in comparison to the other communication devices of the plurality of communication devices.

For example, if a communication link between the first communication device and second communication device is affected by a further communication link between other communication devices, the further communication link may be restricted, e.g., only a time resource, which could not be used for the communication link between the first communication device and second communication device, may be assigned to the further communication link.

In an example, a frequency resource and/or a time resource may be only allocated once per time per radiation boundary area. This way, it can be ensured that no further communication device (e.g., a third communication device) communicating with another communication device (e.g., a fourth communication device) using the same radiation boundary area can use the same frequency resource and/or time resource, which prevents interference such like superimposition. For example, the first and the second communication device may select/use a first frequency resource and/or a first time resource and the third and fourth communication device may use a second frequency resource and/or a second time resource. This way, an interference of the communication between the first communication device and the second communication device on the communication between the third communication device and the fourth communication device can be reduced or even omitted.

In an example, the method may further comprise determining a quality-of-service for a communication link of at least one communication device of the plurality of communication devices and transmitting information about the quality-of-service to the at least one communication device. This way, a user of the communication device, e.g., the first communication device, may be informed about a possible QoS for communication link. For example, if the user is not satisfied with the QoS the user may request an adjusted antenna system parameter. The adjusted antenna system parameter may comprise a different time resource, frequency resource and/or area for communication, which enables a better QoS. Thus, the communication device may be prioritized by the controlling network entity on a user request, which may increase the user's experience.

In an example, the method 100 may further comprise allocating a radiation boundary area of the plurality of radiation boundary areas to the second communication device of the plurality of communication devices to communicate with a third communication device of the plurality of communication devices and transmitting information about the allocated radiation boundary area to the first communication device. This way, the first communication device can be informed about a radiation boundary area, which should be used by the second communication device to communicate with the third communication device. Further, the first communication device can inform the second communication device and/or the third communication device about this information about the radiation boundary area. For example, only the first communication device may have an established communicative connection to the network entity and thus the network entity may not be capable to transmit the information about the radiation boundary area directly to the second communication device. This way, the first communication device can be used as relaying system to transmit the information from the network entity to the second communication device.

More details and properties are mentioned in connection with the embodiments described above and/or below. The example shown in FIG. 1 may comprise one or more optional additional features corresponding to one or more properties mentioned in connection with the proposed concept or one or more examples described below (e.g., FIG. 2-6).

FIG. 2 shows an example of a method 200 for a first communication device. The method 200 for the first communication device for controlling a communication between the first communication device and a second communication device comprises receiving 210 from a controlling base station information about a radiation boundary area to communicate with the second communication device at the first communication device and communicating 220 with the second communication device using the radiation boundary area. This way, the first communication device is enabled to communicate with the second communication with an allocated radiation boundary area, which may improve a performance of the mobile communication system.

The control base station may be the network entity as described with reference to FIG. 1 (e.g., the first communication device may be a counterpart to the network entity described with reference to FIG. 1). For example, the first communication device may be UE, a transportation vehicle, etc.

In an example, the method 200 may further comprise transmitting information about the radiation boundary area to the second communication device. This way, the second communication device can be informed about the radiation boundary area which shall be used for communication with the first communication device. For example, if the first and the second communication device are transportation vehicles the information may be by a Wireless Local Area Network (WLAN) technology and may work directly between vehicle and vehicle (V2V), which form a vehicular ad-hoc network as two V2X senders come within each other's range. Messages like Cooperative Awareness Messages (CAM) or Basic Safety Message (BSM) and Decentralized Environmental Notification Messages (DENM) may be used for communication between the transportation vehicles.

In an example, the method 200 may further comprise receiving the controlling base station information about a radiation boundary area for the second communication device and transmitting information about the received radiation boundary area of the second communication device to the second communication device. This way, the second communication can be informed about an allocated radiation boundary area even if no connection between the network entity and the second communication device is established/possible using the first communication device, e.g., as a relaying system.

In an example, the method 200 may further comprise transmitting dynamic information of an own movement state to the controlling network entity. This way, the first communication device can inform the controlling network entity about an own movement state. Thus, the controlling network entity can use the information about the movement state of the first communication device to adjust the antenna system parameter of the first communication device, which may increase a reliability of a communication link.

In an example, the method may further comprise receiving an adjusted antenna system parameter from the controlling network entity to form an adjusted antenna beam pattern with the antenna system to communicate with the second communication device and communicating with the second communication device using the adjusted antenna beam pattern. By forming an adjusted antenna beam pattern interference with other antenna beam patterns of other communication devices may be reduced or even omitted. This may increase a user's experience, since a reliability of a communication link can be increased, e.g., a communication failure likelihood can be decreased.

In an example, the method may further comprise receiving information about a quality-of-service from the controlling network entity. This way, a user of the first communication device may be informed about a QoS, such that the user can decide based on the QoS the communication link is sufficient. If the communication link is not sufficient the user may request an adjusted antenna system parameter.

In an example, the method may further comprise transmitting a request for an adjusted antenna system parameter to the controlling network entity. This way, the first communication device, e.g., use of the first medication device, can decide if the antenna system parameter is sufficient for use, e.g., a service such like streaming, video telephony, etc.

More details and facets are mentioned in connection with the embodiments described above and/or below. The example shown in FIG. 2 may comprise one or more optional additional features corresponding to one or more properties mentioned in connection with the proposed concept or one or more examples described above (FIG. 1) and/or below (e.g., FIG. 3-6).

Figure 3:
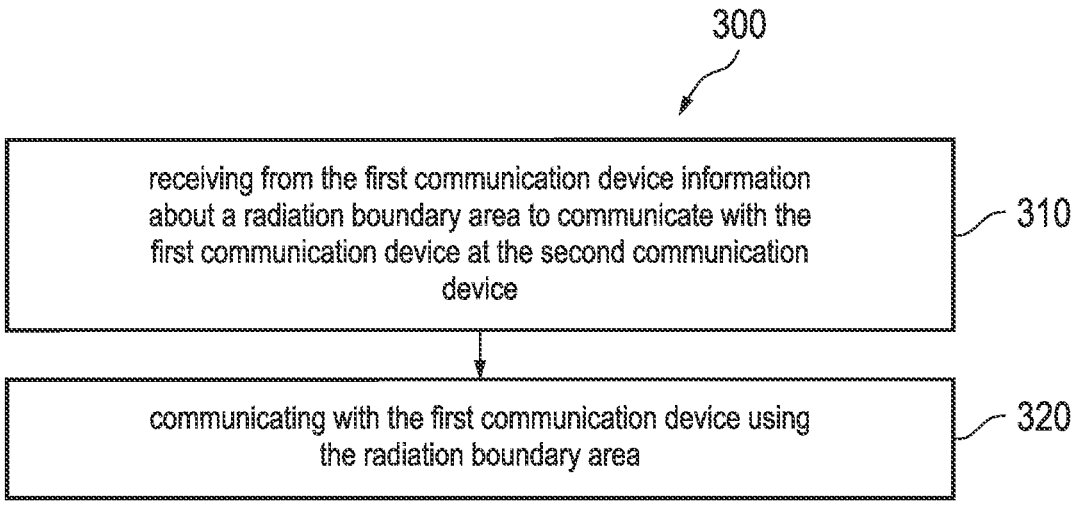
FIG. 3 shows an exemplary embodiment of a method for a second communication device.

FIG. 3 shows an example of a method 300 for a second communication device. The method 300 for controlling a communication between a first communication device and a second communication device comprises receiving 310 from the first communication device information about a radiation boundary area to communicate with the first communication device at the second communication device and communicating 320 with the first communication device using the radiation boundary area. This way, the second communication device can be informed about an allocated radiation boundary area even if the second communication device has no connection to a control base station (e.g., the network entity as described with reference to FIG. 1).

More details and facets are mentioned in connection with the embodiments described above and/or below. The example shown in FIG. 3 may comprise one or more optional additional features corresponding to one or more properties mentioned in connection with the proposed concept or one or more examples described above (FIG. 1-2) and/or below (e.g., FIG. 4-6).

Figure 4:
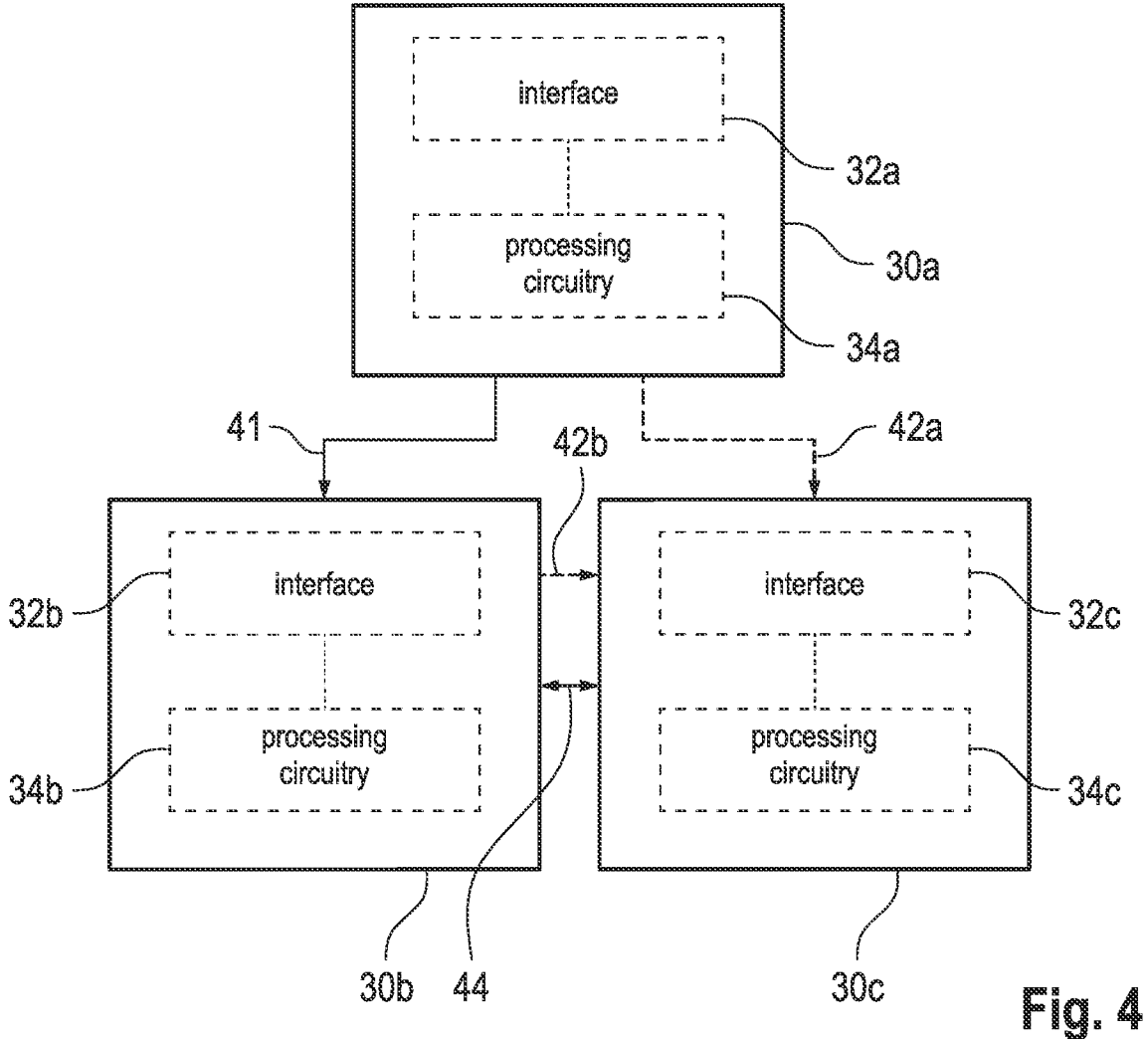
FIG. 4 shows a block diagram of a mobile communication system.

FIG. 4 shows a block diagram of a mobile communication system. The mobile communication system comprises three apparatuses 30a, 30b, 30c. Each apparatus 30a, 30b, 30c comprises one or more interfaces 32a, 32b, 32c configured to communicate with a communication device or user equipment. Each apparatus 30a, 30b, 30c further comprises processing circuitry 34a, 34b, 34c configured to control the one or more interfaces and to perform the method for the network entity 30a as described above (e.g., described with reference to FIG. 1), the method for the first communication device 30b as described above (e.g., described with reference to FIG. 2) and/or the method for the second communication device 30c as described above (e.g., described with reference to FIG. 3).

The network entity 30a may be communicatively coupled to the first communication device 30b. The network entity 30a may allocate a radiation boundary area to the first communication device 30b and may transmit 41 information about the allocated radiation boundary area to the first communication device 30b. Optionally, the network entity 30a may be communicatively coupled to the second communication device 30b and may transmit 42a information about the allocated radiation boundary area to the second communication device 30c. Alternatively, the first communication device 30b may transmit 42b information about the allocated radiation boundary area to the second communication device 30c. The first communication device 30b and the second communication device 30c may communicate 44 with each other using the allocated radiation boundary area.

For example, the apparatus 30a, 30b, 30c can be comprised by a transportation vehicle. For example, the transportation vehicle may be a land vehicle, such a road vehicle, a car, an automobile, an off-road vehicle, a motor vehicle, a bus, a robo-taxi, a van, a truck or a lorry. Alternatively, the transportation vehicle may be any other type of vehicle, such as a train, a subway train, a boat or a ship. For example, the proposed concept may be applied to public transportation (trains, bus) and future methods of mobility (e.g., robo-taxis).

For example, the apparatus 30a may be a controlling network entity 30a. The controlling network entity may manage the used antenna beam patterns of the communication devices 30b, 30c, which are mobile communication devices 30b, 30c. For example, the used antenna beam patterns may be stored in the communication link map. Information about the use antenna beam patterns can be transmitted from the controlling network entity 30a to the communication devices 30b, 30c by transmitting information about the allocated radiation boundary area, e.g., determined antenna system parameters. Further, the information about the allocated radiation boundary area may also comprise time resource (e.g., scheduling performed by the controlling network entity 30a) and/or frequency resource. This transmitted information can be used by the communication devices 30b, 30c for communicating, especially via Device-to-Device (D2D) communication, e.g., using a side-link.

Each communication device 30b, 30c is equipped with a multielement antenna system capable of shaping steering and lacunae the directivity/invoice of the antenna beam pattern, which is used for communication. For example, as described above this capability can be transmitted to the controlling network entity 30a, such that the controlling network entity 30a can be enabled to improve the determination/allocation of the radiation boundary area.

Further, the controlling network entity 30a may be capable to obtain the position of the communication devices 30b, 30c (as described above). The obtained positions of the communication devices 30b, 30c may be used by the controlling network entity 30a to generate a local static map comprising the positions of the communication devices 30b, 30c.

The controlling network entity 30a may be further capable to obtain dynamic information about the communication devices 30b, 30c. For example, future trajectory of at least one communication device 30b, 30c can be obtained, e.g., the future trajectory can be predicted by use of a planned route, by use of statistic information from other communication devices, by tracking of an actual movement and interpolating, received from further controlling network entity, etc. Based on the dynamic information the controlling network entity 30a may generate a local dynamic map.

The controlling network entity 30a may be further capable to acquire, e.g., determining/allocating radiation boundary areas, determining antenna system parameters, and to manage, e.g., adjusting antenna system parameters, adjusting time resources and/or frequency resources, etc., the communication links between the communication devices 30b, 30c. The information about the acquisition and the management of the communication links can distort the communication link map. Thus, the controlling network entity 30a can be able to picture a map of the communication links on top of the locale static/dynamic map of the communication devices, e.g., the communication link map.

The controlling network entity 30a can thus optimize a resource allocation and/or a scheduling for the communication devices 30b, 30c, especially for a cluster of communication devices (e.g., a high density of communication devices in a certain area).

As described above, the network entity 30a may assign different time resources, frequency resources and/or an area for communication (e.g., a specific space in the environment of communication device in the coverage area of the controlling network entity 30a) for communication. The area for communication (e.g., a specific area in space as described with reference to FIG. 5a and FIG. 5b) of communication device 30b, 30c can be based on antenna footprint (and/or an angular region in space) determined by power constraints.

Further, the network entity may assign the different parameters (time/frequency resource, specific space) in a way that performance of the mobile communication system may be improved, e.g., a time-frequency resource reuse-interference trade-off may be performed (e.g., by maximize orthogonality among time resource, frequency resource and specific space). Moreover, the QoS-interference trade-off can be done. Optionally or alternatively, privatization of the certain communication device 30b, 30c, e.g., by assigning resources leading to improved QoS, can be done. For example privatization may be performed by the controlling network entity 30a on a request of a user of the communication device 30b, 30c.

In principle, each parameter affecting a communication link of other communication devices should be considered in the interference trade-off, e.g., time resource, frequency resource, specific space, etc.

For determining the radiation boundary area the trade-off as described above and different available resources may be considered by the controlling network entity 30a. For example, the antenna system parameter may comprise information about a beamwidth considering a balance between beamwidth, a beam updated rate, and associated overhead, a potential outage probability, etc. For example, the antenna system parameter may comprise information about an effective radiated power, e.g., considering a balance between beamwidth (gain) and transmitted power (e.g., to ensure specific range, especially to fully deploy the radiation boundary area). For example, the antenna system parameter may comprise information about a beam shaping, e.g., restricting a coverage to a specific area in space, e.g., to cancel the communication device 30b, 30c or to boost communication device 30b, 30c. further, the antenna system parameter may comprise information about an identifier of the beam, e.g., for using a predefined beam set.

Further, by using the dynamic information the controlling network entity 30a may determine/allocate radiation boundary areas and are determine antenna system parameters which may minimize impairments in the mobile communication system. For example, outage/link failure, overheads (e.g., for beam management), beam misalignments, etc. can be reduced or even omitted.

The controlling network entity 30a may transmit information about the allocated radiation boundary area after optimizing the resource allocation to the communication devices 30b, 30c, e.g., via downlink. Thus, the communication devices 30b, 30c to configure the antenna the system to generate an antenna beam pattern to comply with the allocated/determined radiation boundary area. Further, the controlling network entity 30a may be able to predict QoS profile for each communication link established between the communication devices 30b, 30c. This QoS profile can be transmitted to each communication device 30b, 30c from the controlling network entity 30a. For example, an optimization process of the communication link map can be performed by the controlling network entity 30a periodically and/or if a conflict can be found, e.g., two communication links using the same time resource, frequency resource and specific space. This way, an interference between the communication links in the mobile communication system can be reduced.

As shown in FIG. 4 the respective one or more interfaces 32a, 32b, 32c are coupled to the respective processing circuitry 34a, 34b, 34c at the apparatus 30a, 30b, 30c. In examples the processing circuitry 34a, 34b, 34c may be implemented using one or more processing units, one or more processing devices, any method or mechanism for processing, such as a processor, a computer or a programmable hardware component being operable with accordingly adapted software Similar, the described functions of the processing circuitry 34a, 34b, 34c may as well be implemented in software, which is then executed on one or more programmable hardware components. Such hardware components may comprise a general-purpose processor, a Digital Signal Processor (DSP), a micro-controller, etc. The processing circuitry 34a, 34b, 34c is capable of controlling the interface 32a, 32b, 32c, so that any data transfer that occurs over the interface and/or any interaction in which the interface may be involved may be controlled by the processing circuitry 34a, 34b, 34c. For example, the apparatus 30a, 30b, 30c can be comprised by a transportation vehicle. For example, the transportation vehicle may be a land vehicle, such a road vehicle, a car, an automobile, an off-road vehicle, a motor vehicle, a bus, a robo-taxi, a van, a truck or a lorry. Alternatively, the transportation vehicle may be any other type of vehicle, such as a train, a subway train, a boat or a ship. For example, the proposed concept may be applied to public transportation (trains, bus) and future methods of mobility (e.g., robo-taxis).

In an exemplary embodiment, the apparatus 30a, 30b, 30c may comprise a memory and at least one processing circuitry 34a, 34b, 34c operably coupled to the memory and configured to perform the below mentioned method.

In examples the one or more interfaces 32a, 32b, 32c may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, e.g., transmit or receive signals, information with further internal or external components. The one or more interfaces 32a, 32b, 32c may comprise further components to enable communication between transportation vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

More details and facets are mentioned in connection with the embodiments described above and/or below. The example shown in FIG. 4 may comprise one or more optional additional features corresponding to one or more properties mentioned in connection with the proposed concept or one or more examples described above (FIG. 1-3) and/or below (e.g., FIG. 5-6).

FIGS. 5a and 5b show different examples for communication between a plurality of communication devices 30b, 30c, 50b, 52a, 52b, 52c.

A base station (BS), e.g., the network entity described with reference to FIG. 1, may manage the scheduling and resource allocation of multiple communication devices 30b, 30c, 50b, 52a, 52b, 52c communicating via Device-to-Device (D2D) (e.g., a sidelink) or even to infrastructure or the BS itself. Each communication device 30b, 30c, 50b, 52a, 52b, 52c may be equipped with multi-element antenna systems capable of shaping, steering and tuning the directivity/beamwidth of the radiation pattern that they communicate with.

The BS may generate a grid consisting of a plurality of tiles (triangles in FIG. 5a, 5b). Further, the BS may allocate for certain communication devices 30b, 30c, 50b, 52a, 52b, 52c a radiation boundary area 60, 66, 70 (see the connected hatched triangles), e.g., a specific area in space based on an antenna footprint (or an angular region in space), determined by e.g., by power constraints, an antenna capability, etc. Further the BS may allocate a time resource (a time frame/slot) for communication using each radiation boundary area 60, 66, 70. Further, the BS may allocate a frequency resource (e.g., a channel/subchannel) for communications using each radiation boundary area 60, 66, 70.

The radiation boundary area 60, 66, 70 may be projected in/based on a grid (e.g., a grid size may be based on a coverage area of the BS) with a common geometry for all communication devices 30b, 30c, 50b, 52a, 52b, 52c (compare FIG. 5a and FIG. 5b). For example, the grid can be hexagonal, triangular (geodesic grid), rectangular, or any shape that can uniformly fill space. For example, the map can be global (common for all communication devices 30b, 30c, 50b, 52a, 52b, 52c) or local (specific for the communication devices 30b, 30c, 50b, 52a, 52b, 52c being managed). Tiles 66a, 66b, 70a, 70b, 70c, 70d of the grid (e.g., at least one tile may form a radiation boundary area) may be changed in size to adapt to traffic (e.g., a number of communication devices 30b, 30c, 50b, 52a, 52b, 52c), congestion (e.g., a velocity of at least one of the communication devices 30b, 30c, 50b, 52a, 52b, 52c) and/or to reduce computing needs.

The BS may select the tiles 66a, 66b, 70a, 70b, 70c, 70d of the grid to be allocated for each communication device 30b, 30c, 50b, 52a, 52b, 52c to form the radiation boundary area 60, 66, 70. Further, each tile 66a, 66b, 70a, 70b, 70c, 70d or radiation boundary area 60, 66, 70 of the grid may have its own resource pool (e.g., a time resource pool, a frequency resource pool, etc.). A given resource pool (e.g., a physical resource block) can only be allocated once per tile 66a, 66b, 70a, 70b, 70c, 70d or radiation boundary area 60, 66, 70, for example.

The BS may encapsulate the chosen tiles 66a, 66b, 70a, 70b, 70c, 70d in a message, together with customary time and frequency allocation messages. Further, the BS may add a power limit for each tile not allocated, e.g., a threshold for a radiation energy density outside the allocated tiles. The power radiated towards these non-allocated tiles 66a, 66b, 70a, 70b, 70c, 70d by the communication devices 30b, 30c, 50b, 52a, 52b, 52c may not exceed this threshold. The allocated tile 66a, 60b, 70a, 70b, 70c, 70d or radiation boundary area 60, 66, 70 may represent a constrain in antenna footprint for each managed communication device 30b, 30c, 50b, 52a, 52b, 52c. Each communication device 30b, 30c, 50b, 52a, 52b, 52c may adapt its radiation pattern so that the antenna footprint does not exceed the allocated space (the radiation boundary area formed by at least one tile), e.g., such that the threshold for the radiation energy density is not exceeded outside the allocated tiles.

For example, the BS may allocate a radiation boundary area 60 to the first communication device 30b for communicating with the second communication device 30c (see FIG. 5a). The radiation boundary area 60 may consists of five triangular tiles of the grid. The radiation boundary area 60 may be used by the first communication device 30b and the second communication device 30 to communicate with each other.

For example, the BS may allocate a radiation boundary area 70 to the first communication device 50b. The radiation boundary area 70 consists of four triangular tiles 70a, 70b, 70c, 70d. For communication with a second communication device 52a the first communication device 50b may use the tiles 70a, 70c and 70d, for communication with another second communication device 52b the tiles 70a and 70c and for communication with another second communication device 52c the tiles 70a, 70b and 70c. Thus, the tile 70a and 70c may be used to communicate with each second communication device 52a, 52b, 52c. For example, for communication with the second communication device 52c a different frequency resource may be assigned as for communication with the other second communication devices 52b, 52c. This way, the first communication device 50b may be capable to communicate with each other second communication device 52a, 52b, 52c at the same using the same tiles 70a, 70c.

As can be seen in FIG. 5b a tile 66a, 66b of a radiation boundary area 60, 66 can be allocated to different communication devices 30c, 30b, 90, 92. Both the radiation boundary area 60 for communication of the first communication device 30b with the second communication device 30c and the radiation boundary area 66 for communication of a third communication device 90 with a fourth communication device 92 may comprise the same tiles 66a, 66b. In this case, the same time resource and/or frequency resource (tile hatching vertical) may be allocated for different communication devices (both unicast and groupcast) across a space, e.g., the coverage area of the BS, for different radiation boundary areas 60 which does not overlap (does not comprise the same tiles 66a, 66b). The vertically hatched tiles represent the same time resource and/or frequency resource. When the radiation boundary areas 60, 66 comprises the same allocated tiles 66a, 66b for a given link, a different time resource and/or frequency resource may be given to the other radiation boundary area 66 (tile hatching horizontal). For example, tiles 66a, 66b can be allocated to both radiation boundary areas 60, 66 and thus the other radiation boundary area 66 may have a different time resource and/or frequency resource.

For example, the tiles shown in FIGS. 5a and 5b may be comprised by the communication link map. The hatched tiles illustrate areas for communication between different communication devices generated by antenna system parameters received by each communication device from the controlling network entity. As described above the vertically hatched tiles represent different time resources and/or frequency resources. For example the different time resources and/or frequency resources can be used to prioritize the communication link over another communication link.

For example, for communication between different communication devices a first and a second frequency resource may exist. The first frequency resource may provide an increased QoS in comparison to the second frequency resource, for example. This way, by assigning different frequency resources (and/or time resources) the privatization of the communication device may be done. The communication link between the communication device 30b and 30c may be prioritized, since the first frequency resource may be used for this communication link. For the other communication link between the communication device 90 and the communication device 92 may use the second frequency resource may be used. This way, and interference between the communication link and the other communication link can be reduced.

Further, also the time resource assigned to different communication links can be different to decrease interference. For example, the communication device 30b and 30c may only communicate using the communication link comprising the radiation boundary area 60 if no communication at the same time is performed by the communication device 90 and 92 using the communication link comprising the radiation boundary area 66. This way, and interference between the communication devices can be omitted.

For example, the radiation boundary area 66, 90, e.g., an area of the coverage area of the controlling network entity, may be formed by the respective communication device's antenna systems using the received antenna system parameter.

Further, by adjusting the antenna system parameter the radiation boundary area 66, 90 can be adjusted, e.g., a size or shape of radiation boundary area, by the controlling network entity.

More details and facets are mentioned in connection with the embodiments described above and/or below. The example shown in FIG. 5 may comprise one or more optional additional features corresponding to one or more properties mentioned in connection with the proposed concept or one or more examples described above (FIG. 1-4) and/or below (e.g., FIG. 6).

Figure 6:
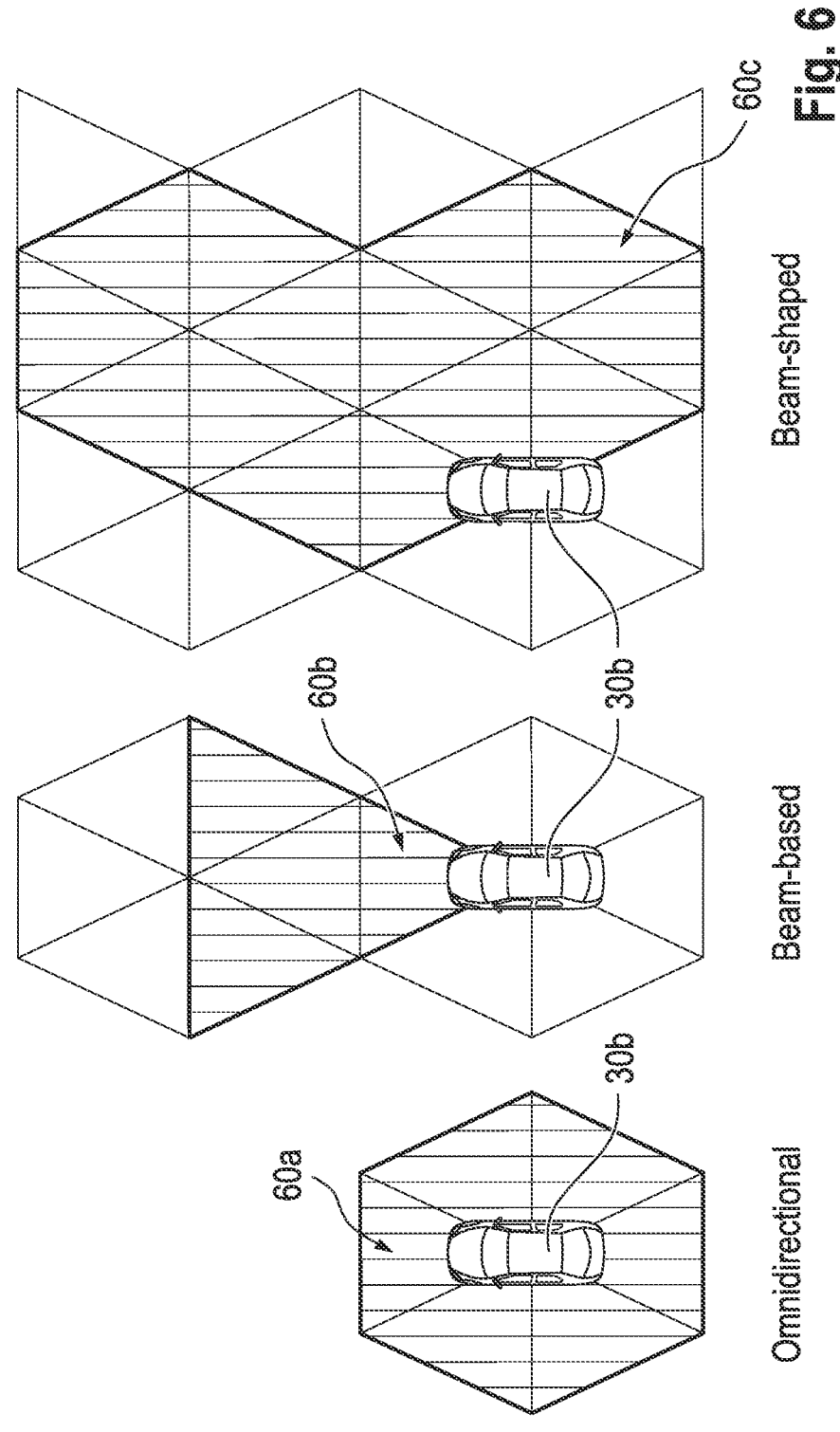
FIG. 6 shows examples of different patterns of a radiation boundary area.

FIG. 6 shows examples of different patterns of a radiation boundary area. As can be seen triangular grids (which can be contained in hexagonal grids) can be used to represent the most common antenna footprints. Hexagonal coordinates are customary in world mapping, e.g., maps for transportation vehicle are based normally on hexagons. Depending on a desired radiation characteristic different tile can be assigned by a network entity to a radiation boundary area. For example, all tiles in a surrounding of the first communication device 30b, e.g., a transportation vehicle 30b, can be assigned to the radiation boundary area 60a. This way, an antenna system of the transportation vehicle 30b may have an omnidirectional radiation pattern. For example, the radiation boundary area 60b may comprise only certain tiles in a forward direction of the transportation vehicle 30b, which can be realized, e.g., with a beam-based shape. For example, the radiation boundary area 60c may comprise only tiles on a side of the transportation vehicle 30b, e.g., a right side, which can be achieved with a beam-shaped radiation pattern.

More details and facets are mentioned in connection with the embodiments described above. The example shown in FIG. 6 may comprise one or more optional additional features corresponding to one or more properties mentioned in connection with the proposed concept or one or more examples described above (FIG. 1-5).

The properties and features described in relation to a particular one of the previous examples may also be combined with one or more of the further examples to replace an identical or similar feature of that further example or to additionally introduce the features into the further example.

Examples may be compliant to or even comprised in certain standard specifications, such as those specified by the 3GPP. Configuration information may for example be communicated using signaling radio bearers, e.g., by using Radio Resource Control (RRC) messages, which are, for example, specified in the *.331 series of 3GPP as layer 3 control plane messages. For example, physical layer specification, e.g., by using Doppler Delay Resolutions and other physical layer specifications may also be affected by present disclosed embodiments, e.g., *.201, *.211, *.212, *.213, *.214, *.216 series in the 3GPP specifications.

Examples may further be or relate to a (computer) program including a program code to execute one or more of the above methods when the program is executed on a computer, processor or other programmable hardware component. Thus, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the operations of the methods described above.

It is further understood that the disclosure of several processes, operations or functions disclosed in the description or claims shall not be construed to imply that these operations are necessarily dependent on the order described, unless explicitly stated in the individual case or necessary for technical reasons. Therefore, the previous description does not limit the execution of several functions to a certain order. Furthermore, in further examples, a single function, process or operation may include and/or be broken up into several sub-functions, -processes or -operations.

If some facets have been described in relation to a device or system, these should also be understood as a description of the corresponding method. For example, a block, device or functional properties of the device or system may correspond to a feature, such as a method operation, of the corresponding method. Accordingly, facets described in relation to a method shall also be understood as a description of a corresponding block, a corresponding element, a property or a functional feature of a corresponding device or a corresponding system.

If some facets have been described in relation to a device or system, these should also be understood as a description of the corresponding method and vice versa. For example, a block, device or functional property of the device or system may correspond to a feature, such as a method operation, of the corresponding method. Accordingly, facets described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The properties and features described in relation to a particular one of the previous examples may also be combined with one or more of the further examples to replace an identical or similar feature of that further example or to additionally introduce the features into the further example.

LIST OF REFERENCE SIGNS

30*a* network entity
32*a* interface
34*a* processing circuitry
30*b* first communication device
32*b* interface
34*b* processing circuitry
30*c* second communication device
32*c* interface 34*c* processing circuitry
41 transmit information about the radiation boundary area
42*a* transmit information about the radiation boundary area
42*b* transmit information about the radiation boundary area
44 communicate using the radiation boundary area
50*b* first communication device
52*a*, 52*b*, 52*c* second communication device
60, 60*a*, 60*b*, 60*c* radiation boundary area
66 radiation boundary area
66*a*, 66*b* tile of a radiation boundary area
70 radiation boundary area
70*a*, 70*b*, 70*c*, 70*d* tile of a radiation boundary area
90 third communication device
92 fourth communication device
100 method for a network entity
110 obtaining positions of a plurality of communication devices
120 determining a plurality of radiation boundary areas
130 allocating a radiation boundary area
140 transmitting information about the allocated radiation boundary area
200 method for a first communication device
210 receiving from a controlling base station
220 communicating with the second communication device
300 method for a second communication device
310 receiving from the first communication device information about a radiation boundary
320 communicating with the first communication device

The invention claimed is:

1. A network entity apparatus comprising:
one or more interfaces configured to communicate with communication devices; and
processing circuitry configured to control the one or more interfaces and to perform a method for a network entity controlling communication between a first communication device and a second communication device, the method including:
obtaining positions of a plurality of communication devices;
determining a plurality of radiation boundary areas in an environment of the plurality of communication devices by dividing a space into the plurality of radiation boundary areas,
allocating a radiation boundary area of the plurality of radiation boundary areas to the first communication device of the plurality of communication devices to communicate with the second communication device of the plurality of communication devices; and
transmitting information about the allocated radiation boundary area to the first communication device and/or the second communication device;
generating an antenna system parameter for each communication device of the plurality of communication devices;
storing the antenna system parameters for each communication device in a communication link map;
transmitting the antenna system parameters to each communication device of the plurality of communication devices; and
adjusting at least one antenna system parameter of the communication link map to reduce an interference of antenna beam patterns of the plurality of communication devices, which are formed by the antenna system of each communication device based on the antenna system parameters of the communication link map.

2. The apparatus of claim 1, wherein the plurality of radiation boundary areas is determined based on a structured grid.

3. The apparatus of claim 1, wherein the plurality of radiation boundary areas is determined based on an antenna capability of the first communication device and/or the second communication device.

4. The apparatus of claim 1, wherein the method further includes allocating a frequency resource and/or a time resource for each radiation boundary area of the plurality of radiation boundary areas.

5. The apparatus of claim 1, wherein the method further includes:

obtaining dynamic information about a movement state of the first communication device;

determining a predicted trajectory of the first communication device; and predicting a communication failure of the first communication device communicating with the second communication device using the antenna system parameter transmitted by the network entity to the first communication device.

6. The apparatus of claim 4, wherein a frequency resource and/or time resource is only allocated once per time per radiation boundary area.

7. The apparatus of claim 1, wherein the method further includes:

allocating a radiation boundary area of the plurality of radiation boundary areas to the second communication device of the plurality of communication devices to communicate with a third communication device of the plurality of communication devices; and transmitting information about the allocated radiation boundary area to the first communication device.

8. A transportation vehicle comprising the apparatus of claim 1.

9. A method for a network entity controlling communication between a first communication device and a second communication device, the method comprising:

obtaining positions of a plurality of communication devices;

determining a plurality of radiation boundary areas in an environment of the plurality of communication devices by dividing a space into the plurality of radiation boundary areas, allocating a radiation boundary area of the plurality of radiation boundary areas to the first communication device of the plurality of communication devices to communicate with the second communication device of the plurality of communication devices; and transmitting information about the allocated radiation boundary area to the first communication device and/or the second communication device;

generating an antenna system parameter for each communication device of the plurality of communication devices;

storing the antenna system parameters for each communication device in a communication link map;

transmitting the antenna system parameters to each communication device of the plurality of communication devices; and adjusting at least one antenna system parameter of the communication link map to reduce an interference of antenna beam patterns of the plurality of communication devices, which are formed by the antenna system of each communication device based on the antenna system parameters of the communication link map.

10. The method of claim 9, wherein the plurality of radiation boundary areas is determined based on a structured grid.

11. The method of claim 9, wherein the plurality of radiation boundary areas is determined based on an antenna capability of the first communication device and/or the second communication device.

12. The method of claim 9, further comprising allocating a frequency resource and/or a time resource for each radiation boundary area of the plurality of radiation boundary areas.

13. The method of claim 9, further comprising:

obtaining dynamic information about a movement state of the first communication device;

determining a predicted trajectory of the first communication device; and predicting a communication failure of the first communication device communicating with the second communication device using the antenna system parameter transmitted by the network entity to the first communication device.

14. The method of claim 12, wherein a frequency resource and/or time resource is only allocated once per time per radiation boundary area.

15. The method of claim 9, further comprising:

allocating a radiation boundary area of the plurality of radiation boundary areas to the second communication device of the plurality of communication devices to communicate with a third communication device of the plurality of communication devices; and transmitting information about the allocated radiation boundary area to the first communication device.

16. A method for a first communication device for controlling a communication between the first communication device and a second communication device included in a plurality of communication devices, the method comprising:

receiving, from a controlling base station, information about a radiation boundary area included in a plurality of radiation boundary areas determined in an environment of the plurality of communication devices, wherein the received radiation boundary area information indicates allocation of the radiation boundary area for the first communication device to communicate with the second communication device; and communicating with the second communication device using the allocated radiation boundary area, wherein an antenna system parameter is generated for each communication device of the plurality of communication devices, wherein the antenna system parameters for each communication device are stored in a communication link map and transmitted to each communication device of the plurality of communication devices, such that at least one antenna system parameter of the communication link map can be adjusted to reduce an interference of antenna beam patterns of the plurality of communication devices, which are formed by the antenna system of each communication device based on the antenna system parameters of the communication link map.

17. The method of claim 16, further comprising:

receiving information from the controlling base station about a radiation boundary area for the second communication device; and transmitting information about the received radiation boundary area of the second communication device to the second communication device.

18. A method for controlling a communication between a first communication device and a second communication device included in a plurality of communication devices, the method comprising:

receiving information from the first communication device about a radiation boundary area included in a plurality of radiation boundary areas determined in an environment of the plurality of communication devices, wherein the received radiation boundary area information indicates allocation of the radiation boundary area for the second communication device to communicate with the first communication device; and communicating with the first communication device using the allocated radiation boundary area, wherein an antenna system parameter is generated for each communication device of the plurality of communication devices, wherein the antenna system parameters for each communication device are stored in a communication link map and transmitted to each communication device of the plurality of communication devices, such that at least one antenna system parameter of the communication link map can be adjusted to reduce an interference of antenna beam patterns of the plurality of communication devices, which are formed by the antenna system of each communication device based on the antenna system parameters of the communication link map.

19. A non-transitory computer readable medium including a computer program having program code for performing the method of claim 11, when the computer program is executed on a computer, a processor, or a programmable hardware component.

\* \* \* \* \*